US012479627B2

(12) United States Patent
Fraser

(10) Patent No.: US 12,479,627 B2
(45) Date of Patent: Nov. 25, 2025

(54) TINTABLE STORAGE BOX

(71) Applicant: Mark Fraser, Oshawa (CA)

(72) Inventor: Mark Fraser, Oshawa (CA)

( * ) Notice: Subject to any disclaimer, the term of this patent is extended or adjusted under 35 U.S.C. 154(b) by 75 days.

(21) Appl. No.: 18/393,816

(22) Filed: Dec. 22, 2023

(65) Prior Publication Data

US 2025/0206503 A1 Jun. 26, 2025

(51) Int. Cl.
*B65D 25/54* (2006.01)
*B65D 25/20* (2006.01)
*B65D 43/02* (2006.01)
*B65D 55/02* (2006.01)
*G07C 9/33* (2020.01)

(52) U.S. Cl.
CPC ............. *B65D 25/54* (2013.01); *B65D 25/20* (2013.01); *B65D 43/0202* (2013.01); *B65D 55/02* (2013.01); *G07C 9/33* (2020.01); *B65D 2543/00194* (2013.01)

(58) Field of Classification Search
CPC .... B65D 25/54; B65D 25/20; B65D 43/0202; B65D 55/02; B65D 2543/00194; G07C 9/33
See application file for complete search history.

(56) References Cited

U.S. PATENT DOCUMENTS

| 10,039,401 B1 | 8/2018 | Romanucci |
| 10,925,425 B2 | 2/2021 | Chenier |
| 10,934,064 B2 * | 3/2021 | De Wilde .............. B65D 43/22 |
| 11,160,409 B2 | 11/2021 | Bowman |
| 11,373,745 B1 * | 6/2022 | Heaps ................... G06V 40/12 |
| 2010/0251785 A1 | 10/2010 | Zarei |
| 2015/0272824 A1 | 10/2015 | Jaynes et al. |
| 2016/0297580 A1 * | 10/2016 | Batzel ................ B65D 21/0204 |
| 2018/0226056 A1 * | 8/2018 | Chan ........................ G09F 13/08 |
| 2020/0377266 A1 * | 12/2020 | Lotfi ..................... B65D 43/162 |
| 2020/0410433 A1 | 12/2020 | Rahilly et al. |
| 2021/0059455 A1 * | 3/2021 | Bowman ................ B65D 81/18 |

(Continued)

FOREIGN PATENT DOCUMENTS

| CN | 110870655 A | 3/2020 |
| CN | 214127345 U | 9/2021 |

OTHER PUBLICATIONS

International Search Report and Written Opinion for International Application No. PCT/IB2024/063073, dated Apr. 22, 2025, 07 Pages.

*Primary Examiner* — Mohamed Barakat

(57) ABSTRACT

A tintable storage box is provided. The tintable storage box includes a container having one or more walls that form an interior compartment for storing items. A door controls access to the interior compartment and uses a locking mechanism to change between a locked and unlocked state. At least one wall of the storage box has an adjustable opacity panel that is switchable between a plurality of visible states, including a transparent state and a high opacity state via a controller. In a high opacity state, the opacity panel shields the contents of the compartment to enhance privacy and security. An interface communicates with the controller to control the opacity panel and/or the locking mechanism. The interface provides for interaction through voice commands, optical inputs, vibration, touch, keypad input, key-fob control, mobile phone control, manual switches, and location-based parameters.

12 Claims, 2 Drawing Sheets

(56) References Cited

U.S. PATENT DOCUMENTS

| | | |
|---|---|---|
| 2021/0196071 A1 | 7/2021 | Gecho |
| 2022/0003039 A1 | 1/2022 | Oh et al. |
| 2022/0022627 A1 | 1/2022 | Yan et al. |
| 2022/0204230 A1 | 6/2022 | Feuilloley et al. |
| 2022/0227550 A1* | 7/2022 | Chu ........................ B65D 51/24 |

* cited by examiner

TINTABLE STORAGE BOX

BACKGROUND OF THE INVENTION

The present invention relates to a tintable storage box. The tintable storage box comprises a tintable storage box having a container with walls forming an interior compartment, equipped with an adjustable opacity panel switchable between transparent and high opacity states controlled by a controller that manages the panel states. The interior compartment's visibility is determined by the panel state. The box includes a locking mechanism to secure items when in a locked state. An interface facilitates communication with the controller providing for integration of dynamic tinting and security functionalities within the storage box.

The prevalence of storage solutions has witnessed a significant upswing in recent times, mirroring the dynamic lifestyles and evolving storage requirements of individuals across the globe. From securing valuables in short-term storage for quick access to stowing away items for extended periods, the demand for versatile and reliable storage options has never been more pronounced. In a world where the preservation of personal belongings and sensitive items is paramount, the use of safes, storage containers, and similar facilities has become an integral part of daily life.

Various types of high-value products may be susceptible to theft and tampering, especially when those products are easily visible to potential thieves. In such cases, tintable containers with locking mechanisms offer a protective solution by concealing the contents, mitigating the risk of unauthorized access, and ensuring the security of valuable items.

Within this landscape, electrochromic materials, such as tungsten oxide (WO3), have found application in various fields, including windows for residential, commercial, and other purposes. The electrochromic capability allows for the electronic adjustment of opacity of the panel. This technological advancement aligns with the increasing need for storage solutions that offer not only security but also adaptability to changing privacy requirements. However, the existing options, including electrochromic windows, while addressing specific needs, present limitations when applied to storage containers. The typical electrochromic window, designed for altering the transparency of windows electronically, lacks the integration required for secure storage. This deficiency emphasizes the need for a specialized solution that combines tintable properties with secure storage features.

Existing storage methods, such as manual labeling or traditional opaque containers, often fall short of meeting the evolving needs of modern users. Manual labeling requires meticulous organization and can be time-consuming to maintain, while opaque containers limit visibility, hindering quick identification of stored items. These shortcomings have been a persistent challenge for individuals seeking an efficient and secure storage solution.

In view of these developments, there exists a need for a container with adjustable opacity panels. These panels allow users to switch between visible and private states. The present invention addresses these challenges by introducing a new intelligent locking mechanism, controlled through various means such as fingerprint recognition and keypad input, enhances the security of stored items. The storage box also provides for various applications across fields, such as storage of hospital records to personal security, by integrating various control options, including voice, optical, vibration, touch, keypad, key-fob, mobile phone control, manual switch, and location-based controls.

By introducing a combination of adjustable opacity panels and advanced locking mechanisms, the storage box provides an innovative and effective solution to the shortcomings of traditional storage methods. This device not only addresses the evolving needs of modern users but is adaptable as a superior alternative in the realm of storage management, catering to a diverse range of users worldwide.

In light of the devices disclosed in the known art, it is submitted that the present invention substantially diverges in design elements and methods from the known art and consequently it is clear that there is a need in the art for an improvement in tintable storage boxes with tintable and controllable containers. In this regard the instant invention substantially fulfills these needs.

SUMMARY OF THE INVENTION

In view of the foregoing disadvantages inherent in the known types of tintable security storage boxes, the present invention provides a storage box having dynamic visibility control that controls adjustable opacity panel within the container's walls. The panel is switchable between a transparent state and a high opacity state, offering users the ability to adapt the visibility of stored items.

It is an objective of the present invention to provide an embodiment of the storage box that incorporates a locking mechanism that transitions the container between a locked state and an unlocked state. In the locked state, the door is securely locked, enhancing the overall security of the items stored within the container.

It is yet another objective of the present invention to provide an embodiment of the storage box with various accessibility and control options, such as voice, optical, vibration, touch, keypad, key-fob, mobile phone control, manual switch, and location-based parameters. Additionally, the storage box comprises security and user controls such as fingerprint recognition, keypad input, and various control options. In this way, the storage box is suitable for various settings, including homes, offices, and other environments.

It is therefore an object of the present invention to provide a new and improved storage box that has all of the advantages of the known art and none of the disadvantages.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
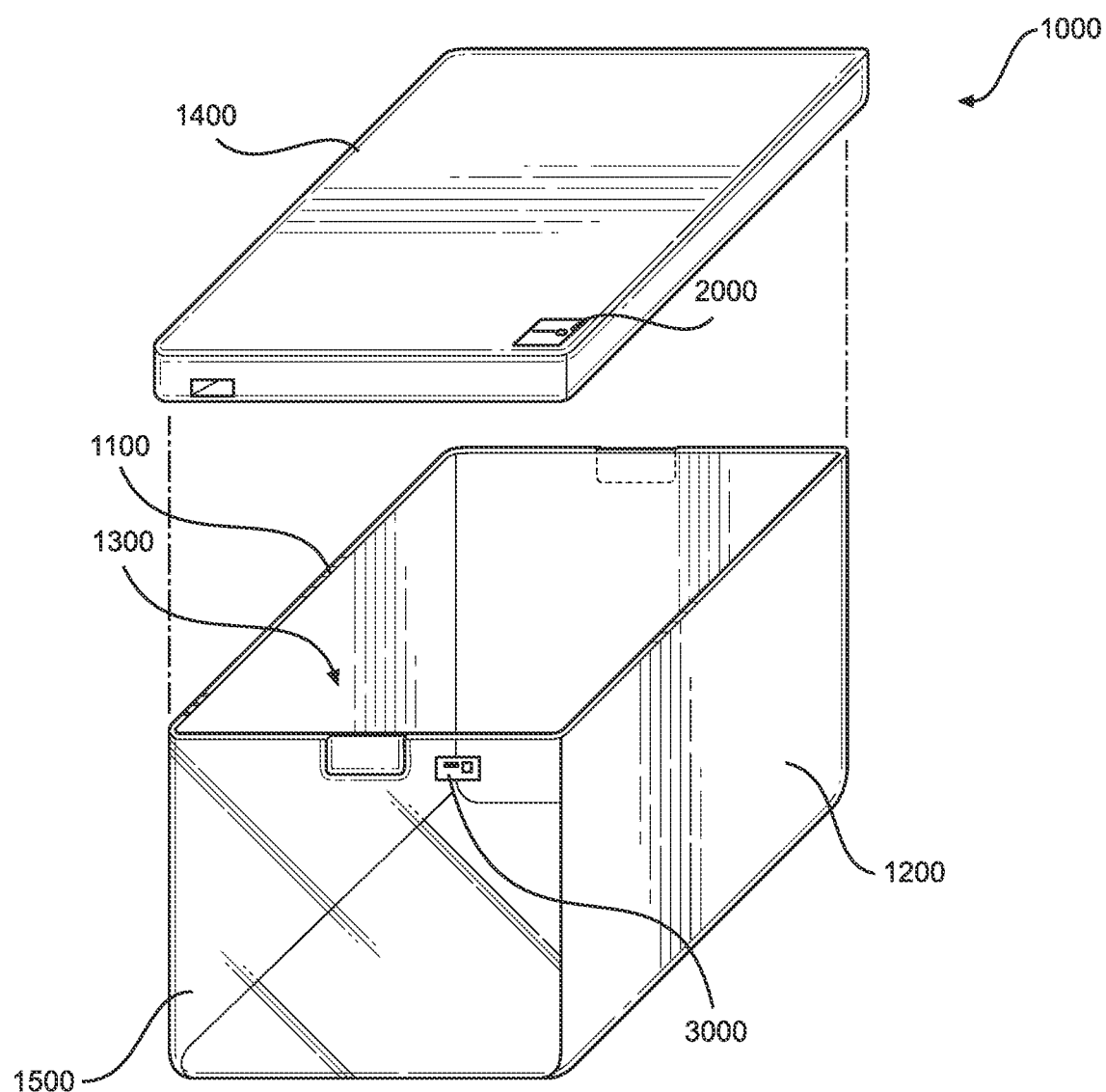
FIG. 1 shows a perspective view of an embodiment of the storage box with door lifted to expose the interior compartment.

Reference is made herein to the attached drawings. Like reference numerals are used throughout the drawings to depict like or similar elements of the system. For the purpose of presenting a brief and clear description of the present invention, the embodiment discussed will be used for storing and retrieving objects within the interior compartment of the storage box. The figures are intended for representative purposes only and should not be considered to be limiting in any respect. Furthermore, the described features, structures, or characteristics may be combined in any suitable manner in one or more embodiments. In the following description, numerous specific details are provided to give a thorough understanding of embodiments.

Reference will now be made in detail to the exemplary embodiment(s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment," "first embodiment", "second embodiment", or "third embodiment" does not necessarily refer to the same embodiment.

Referring now to FIG. 1, there is shown a perspective view of an embodiment of the storage box with door lifted to expose the interior compartment. The storage box 1000 provides a storage solution for various users having dynamic tinting features, an advanced security mechanism, and a multitude of user control. The storage box 1000 comprises a container 1100 with one or more walls 1200 that define an interior compartment 1300. The compartment 1300 is configured to securely store various items, ensuring both privacy and accessibility. The container 1100 includes a door 1400, providing access to the interior compartment 1300. In the shown embodiment, the door 1400 is formed as a removable wall disposed on an upper end thereof, similar to a lid. In alternative embodiments, the door 1400 is formed as part of the sidewall 1200.

In the shown embodiment, a locking mechanism 2000 is disposed in such a way that the locking mechanism 2000 is adapted to secure the door 1400 to one or more of the sidewalls 1200. The locking mechanism 2000 is adapted to be controlled one of the following: fingerprint recognition, pattern drawing on a keypad, and a backlit keypad feature. The locking mechanism 2000 is adapted to transition the container between a locked state and an unlocked state, wherein the locked state the door is locked, and the items stored in the container are secured. In the unlocked state, the door 1400 is movable such that the interior compartment 1300 is readily accessible for the placement and removal of objects therefrom.

In the shown embodiment, an adjustable opacity panel 1500 is integrated into one of the walls 1200 which allows for dynamic control over the visibility of the stored items. The opacity panel 1500 is adapted to switch between a transparent state and a high opacity state. In the transparent state, the interior compartment 1300 becomes visible through the panel, facilitating easy identification of stored items. Conversely, in the high opacity state, the interior compartment 1300 becomes non-visible, ensuring enhanced privacy and security.

In one embodiment, the opacity panel 1500 comprises the entire wall 1200 or door 1400. In other embodiments, the opacity panel 1500 forms a portion of the wall 1200. The opacity panel 1500 comprises an electrochromic material that is adapted for a reversible change in optical characteristics when subjected to a voltage change. In one embodiment, the electrochromic material is tungsten oxide ($WO_3$). The change in opacity state is achieved through electrochemical reduction, wherein a small voltage applied to the electrochromic material induces a reversible coloration transition, typically from transparent to a high opacity state. In the transparent state, the interior compartment 1300 is visible through the panel 1500, facilitating easy identification of stored items. Alternatively, in the high opacity state, the panel 1500 becomes non-visible, ensuring enhanced privacy and security for the stored contents.

In one embodiment, the states of the opacity include a plurality of visible exhibits a versatile range of visible states, extending beyond mere transparency and high opacity. The plurality of visible states encompasses an array of colors and visualization effects which may be predetermined or customized. The visualization effects add an additional layer of functionality, allowing users to implement dynamic patterns or graphical displays on the adjustable opacity panel.

Figure 2:
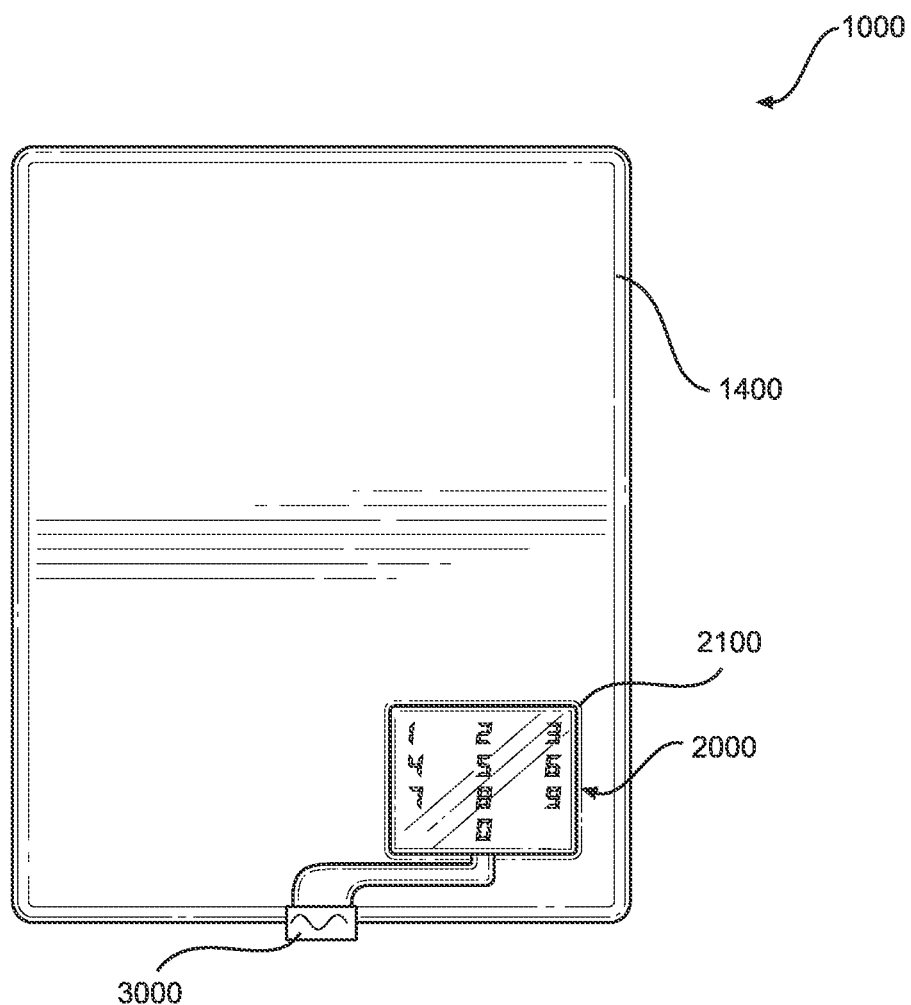
FIG. 2 shows an overhead schematic view of an embodiment of the storage box with interface and locking mechanism.

Referring now to FIG. 2, there is shown an overhead schematic view of an embodiment of the storage box with interface and locking mechanism. In the shown embodiment, the dynamic control of the opacity state is facilitated by a controller 3000, which is configured to switch the panel between transparent and high opacity states. This controller 3000 is configured to communicate through various devices and means via an interface 4000. In some embodiments, the interface includes voice commands, optical inputs, vibration, touch, keypad input, key-fob control, mobile phone control, manual switches, and location-based parameters. The diverse interface options provide users with precise and adaptable control over the opacity of the storage box.

As shown in FIGS. 1 and 2, the locking mechanism 2000 is also controlled by the controller 3000. In other embodiments, the locking mechanism 2000 comprises a distinct lock interface 2100 for controlling the state of the locking mechanism 2000. These lock interfaces 2100 may include, but are not limited to, fingerprint recognition, pattern drawing on a keypad, backlit keypad features, and mobile phone control. Each lock interface 2100 type offers a unique method for users to interact with and control the locking mechanism, contributing to the adaptability and versatility of the storage box in different usage scenarios.

In one embodiment, the tintable box 1000 is without a door 1400 towards the upper side. Rather, the door 1400 is positioned along a sidewall for access to the interior volume. In such an embodiment, the interface 2100 is also positioned on a side. For example, the tintable box 1000 may be used for storing wine bottles, glasses, or the like, which benefits from a door 1400 and interface positioned on a side thereof. Moreover, the contents disposed within the interior volume are visible through the opacity panel when in a visible state.

In one embodiment, the tintable box 1000 is equipped with an integrated onboard battery configured to supply electrical power to its various components. This self-contained power source provides isolated use of the storage box over short to intermediate time periods. The onboard battery ensures the continuous and reliable operation of the storage box, particularly in situations where external power sources may be limited or unavailable. In an alternative embodiment, the tintable box 1000 demonstrates a heightened adaptability with the inclusion of electrical connectors strategically integrated into its design. These connectors are configured to connect with external power sources. In some embodiments, both the battery and connectors are included to provide users with the option to select the power from the onboard battery or power from external power outlets.

In one embodiment, the tintable box 1000 further comprises a display screen for displaying information about the contents stored within the container. This visual aid enhances user interaction, offering a convenient and informative experience when managing stored items.

In one embodiment, the tintable box 1000 can be accessed through various devices, including desktop computers, laptops, tablets, handheld devices, and smartphones. Moreover, the tintable box 1000 may include a wireless transceiver for wireless communication with such devices. The wireless transceiver operates based on wireless communication standards and protocols, enabling the storage box 1000 to establish connections with compatible devices or networks. The transceiver employs radio frequency (RF) technology to transmit and receive data wirelessly.

In one embodiment, the tintable box 1000 incorporates a GPS receiver configured to determine the precise coordinates of the container. The controller, in turn, is adapted to send these GPS coordinates to the interface, providing users with real-time information about the location of the storage box. Additionally, the inclusion of a geofencing feature allows the controller to automatically adjust the panel's opacity state when the container enters or exits predefined geographic areas, adding an extra layer of context-aware functionality.

In use, the tintable box 1000 may comprise two operational modes, including a first default mode for long-term storage wherein the display is not powered and a second powered mode for shorter storage periods wherein the display is powered and activated. A proximity sensor may also be disposed in the box 1000 for detecting when a user approaches the container, so as to activate the display and interface. In one embodiment, the controller is configured to adjust the opacity of the panel based on ambient light conditions. Moreover, the controller can be programmed to automatically switch the panel to a specific opacity state at predefined times or based on user-defined criteria.

In one exemplary use, the user opens the door of the container, revealing the interior compartment. They insert the objects to be stored, ensuring that the items are properly arranged within the space. At this point, the adjustable opacity panel is set to the transparent state, allowing the user to visually confirm the correct placement and organization of the items. Once the items are securely positioned within the container, the user has the option to change the opacity of the panel. Using the controller, which may be interfaced through various means such as voice commands, keypad input, or mobile phone control, the user can switch the panel to the high opacity state. This action renders the contents of the interior compartment nonvisible, providing an additional layer of privacy and security. To further secure the stored items, the tintable storage box includes a locking mechanism. The user activates this mechanism through the controller, transitioning the container to a locked state. In this state, the door is securely locked, preventing unauthorized access to the stored items. The locking mechanism enhances the overall security of the tintable storage box. When the user needs to retrieve or rearrange the stored items, they can unlock the container by using the controller to transition it to the unlocked state. The door can then be opened, providing easy access to the interior compartment.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tintable storage box, comprising:
   a container having one or more walls that form an interior compartment adapted to store items therein, the container including a door for accessing the interior compartment;
   wherein the one or more walls comprise an adjustable opacity panel switchable between a plurality of visible states, including a transparent state and a high opacity state;
   wherein the interior compartment is visible through the panel in the transparent state and not visible in the high opacity state;
   a locking mechanism adapted to transition the container between a locked state and an unlocked state, wherein in the locked state the door is locked to one or more of the walls and the items stored in the container are secured;
   a controller configured to switch the panels between the transparent and high opacity states;
   an interface adapted to communicate with the controller;
   wherein the controller is configured to control the locking mechanism;
   wherein the interface includes a wireless transceiver;
   wherein the interface is located in one of the following: a desktop computer, a laptop computer, a tablet computer, a handheld device, and a smartphone;
   a GPS receiver configured to determine the coordinates of the container;
   wherein the controller is adapted to send the GPS coordinates to the interface;
   a geofencing feature, wherein the controller can automatically change the panel's opacity state when the container enters or exits a predefined geographic area.

2. The tintable storage box of claim 1, wherein the plurality of visible states includes a plurality of colors and visualization effects.

3. The tintable storage box of claim 1, further comprising a battery for onboard electrical power.

4. The tintable storage box of claim 1, wherein the interface is one of the following: voice, optical, vibration, touch, keypad, key-fob, mobile phone control, manual switch, location-based parameters.

5. The tintable storage box of claim 1, further comprising a display screen for displaying information about the items stored within the container.

6. The tintable storage box of claim 1, wherein the locking mechanism is adapted to be controlled by one of the following: fingerprint recognition, pattern drawing on a keypad, and a backlit keypad feature.

7. The tintable storage box of claim 1, wherein the container comprises two operational modes, including a first default mode for long-term storage wherein a display is not powered and a second powered mode for shorter storage periods wherein the display is powered and activated.

8. The tintable storage box of claim 1, further comprising a proximity sensor for detecting when a user approaches the container.

9. The tintable storage box of claim 1, wherein the controller is configured to adjust the opacity of the panel based on ambient light conditions.

10. The tintable storage box of claim 1, wherein the controller can be programmed to automatically switch the panel to a specific opacity state at predefined times or based on user-defined criteria.

11. A tintable storage box, comprising:
- a container having one or more walls that form an interior compartment adapted to store items therein, the container including a door for accessing the interior compartment;
- wherein the one or more walls comprise an adjustable opacity panel switchable between a plurality of visible states, including a transparent state and a high opacity state;
- wherein the interior compartment is visible through the panel in the transparent state and not visible in the high opacity state;
- a locking mechanism adapted to transition the container between a locked state and an unlocked state, wherein in the locked state the door is locked, and the items stored in the container are secured;
- a controller configured to switch the panels between the transparent and high opacity states;
- an interface adapted to communicate with the controller;
- wherein the controller is configured to control the locking mechanism;
- wherein the plurality of visible states includes a plurality of colors and visualization effects;
- wherein the interface includes a wireless transceiver for communication with a phone;
- wherein the container comprises two operational modes, including a first default mode for long-term storage wherein a display is not powered and a second powered mode for shorter storage periods wherein the display is powered and activated.

12. A tintable storage box, comprising:
- a container having one or more walls that form an interior compartment adapted to store items therein, the container including a door for accessing the interior compartment;
- wherein the one or more walls comprise an adjustable opacity panel switchable between a plurality of visible states, including a transparent state and a high opacity state;
- wherein the interior compartment is visible through the panel in the transparent state and not visible in the high opacity state;
- a locking mechanism adapted to transition the container between a locked state and an unlocked state, wherein in the locked state the door is locked to one or more of the walls and the items stored in the container are secured;
- a controller configured to switch the panels between the transparent and high opacity states;
- an interface adapted to communicate with the controller;
- wherein the controller is configured to control the locking mechanism;
- wherein the container comprises two operational modes, including a first default mode for long-term storage wherein a display is not powered and a second powered mode for shorter storage periods wherein the display is powered and activated.

* * * * *